US010862921B2

(12) United States Patent
Ahad et al.

(10) Patent No.: US 10,862,921 B2
(45) Date of Patent: Dec. 8, 2020

(54) APPLICATION-AWARE INTRUSION DETECTION SYSTEM

(71) Applicant: Cisco Technology, Inc., San Jose, CA (US)

(72) Inventors: Syed Abdul Ahad, Bangalore (IN); Amal Padmanabhan, Bangalore (IN); Vinay Gangoli, Bangalore (IN); Pranjal Kumar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 15/664,224

(22) Filed: Jul. 31, 2017

(65) Prior Publication Data

US 2019/0036963 A1 Jan. 31, 2019

(51) Int. Cl.
*H04L 29/06* (2006.01)
*H04L 12/26* (2006.01)
*G06Q 10/10* (2012.01)

(52) U.S. Cl.
CPC ......... *H04L 63/1441* (2013.01); *G06Q 10/10* (2013.01); *H04L 43/04* (2013.01); *H04L 63/1416* (2013.01); *H04L 63/1425* (2013.01)

(58) Field of Classification Search
CPC ............. H04L 63/1441; H04L 63/1416; H04L 63/1425; H04L 43/04; G06Q 10/10
See application file for complete search history.

(56) References Cited

U.S. PATENT DOCUMENTS

| | | | |
|---|---|---|---|
| 7,815,106 B1 | 10/2010 | McConnell | |
| 8,418,249 B1 | 4/2013 | Nucci | |
| 9,531,614 B1* | 12/2016 | Nataraj | H04L 43/08 |
| 2014/0195667 A1* | 7/2014 | Ketchum | H04L 43/067 |
| | | | 709/224 |
| 2016/0381183 A1* | 12/2016 | Jusko | H04L 63/1458 |
| | | | 726/23 |
| 2017/0034193 A1 | 2/2017 | Schulman | |
| 2017/0222893 A1* | 8/2017 | Nataraj | H04L 43/04 |

* cited by examiner

*Primary Examiner* — Dao Q Ho
(74) *Attorney, Agent, or Firm* — Behmke Innovation Group LLC; James M. Behmke; Jonathon P. Western

(57) ABSTRACT

In one embodiment, activity of a plurality of applications in a computer network is monitored, and a plurality of individual business transactions occurring within the plurality of applications may be identified. Additionally network traffic details associated with each particular business transaction of the plurality of individual business transactions may be determined. In response to detecting a network-based threat on a particular network flow within the computer network, the techniques herein may correlate the particular network flow to a corresponding business transaction of the plurality of individual business transactions based on the associated network traffic details of the corresponding business transaction. Accordingly, threat mitigation may be initiated specific to the corresponding business transaction in response to the detected network-based threat being correlated to the corresponding business transaction.

18 Claims, 13 Drawing Sheets

APPLICATION-AWARE INTRUSION DETECTION SYSTEM

TECHNICAL FIELD

The present disclosure relates generally to computer networks, and, more particularly, to an application-aware intrusion detection (or protection) system.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, security is paramount for the integrity and performance of an application. For instance, cyberattacks have been known to cripple Internet sites, applications, and entire organizations. Many attacks, such as denial of service (DoS) or Distributed DoS (DDoS) attacks are simply meant to overrun servers with traffic (generally bogus) in order to prevent the servers from servicing legitimate requests. Other types of intrusions/attacks, such as spyware, malware, viruses, ransomware, bots, and so on, may also inflict some form of security threat (e.g., general interruptions, security breaches (e.g., accessing secure data, credit card information), etc.) to servers, client devices, or even specific applications executing on those servers/clients. Stopping attackers and malicious flows within a computer network is of critical importance to administrators, as is assessing the level of damage caused by such attacks.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
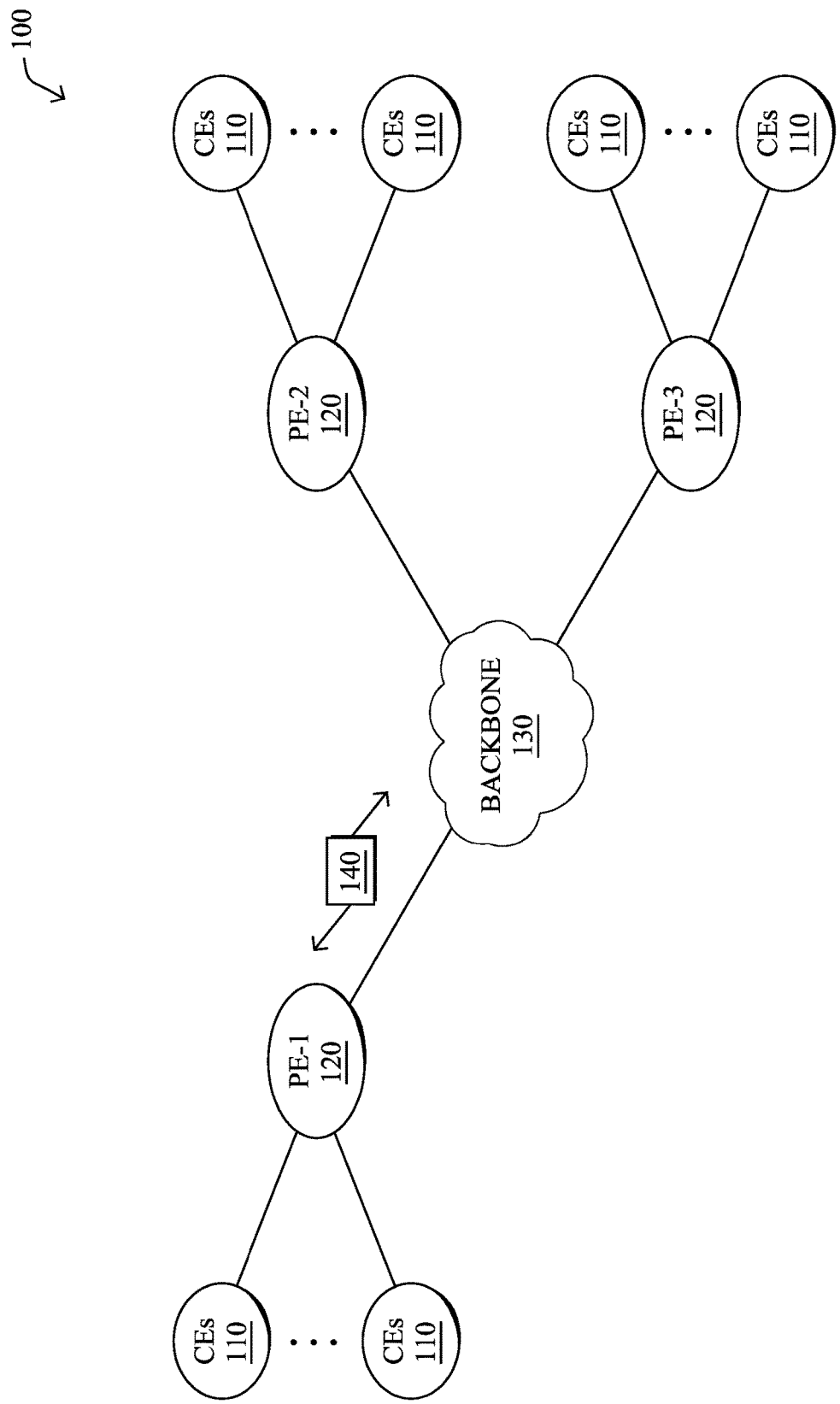
FIGS. 1A-1B illustrate an example computer network.

According to one or more embodiments of the disclosure, techniques herein monitor activity of a plurality of applications in a computer network, and identify a plurality of individual business transactions occurring within the plurality of applications. Additionally network traffic details associated with each particular business transaction of the plurality of individual business transactions may be determined. In response to detecting a network-based threat on a particular network flow within the computer network, the techniques herein may correlate the particular network flow to a corresponding business transaction of the plurality of individual business transactions based on the associated network traffic details of the corresponding business transaction. Accordingly, threat mitigation may be initiated specific to the corresponding business transaction in response to the detected network-based threat being correlated to the corresponding business transaction.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node)

in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
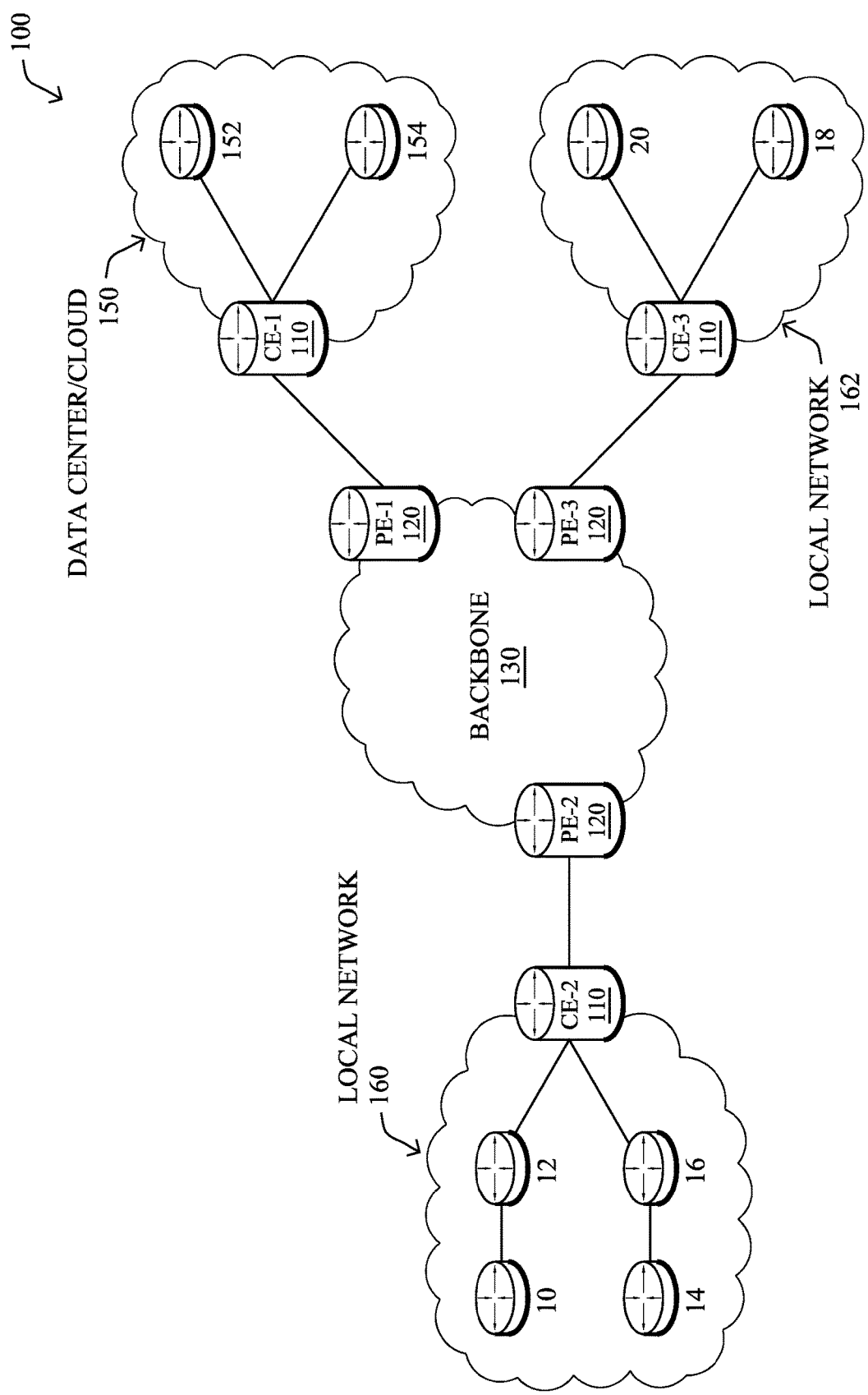

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
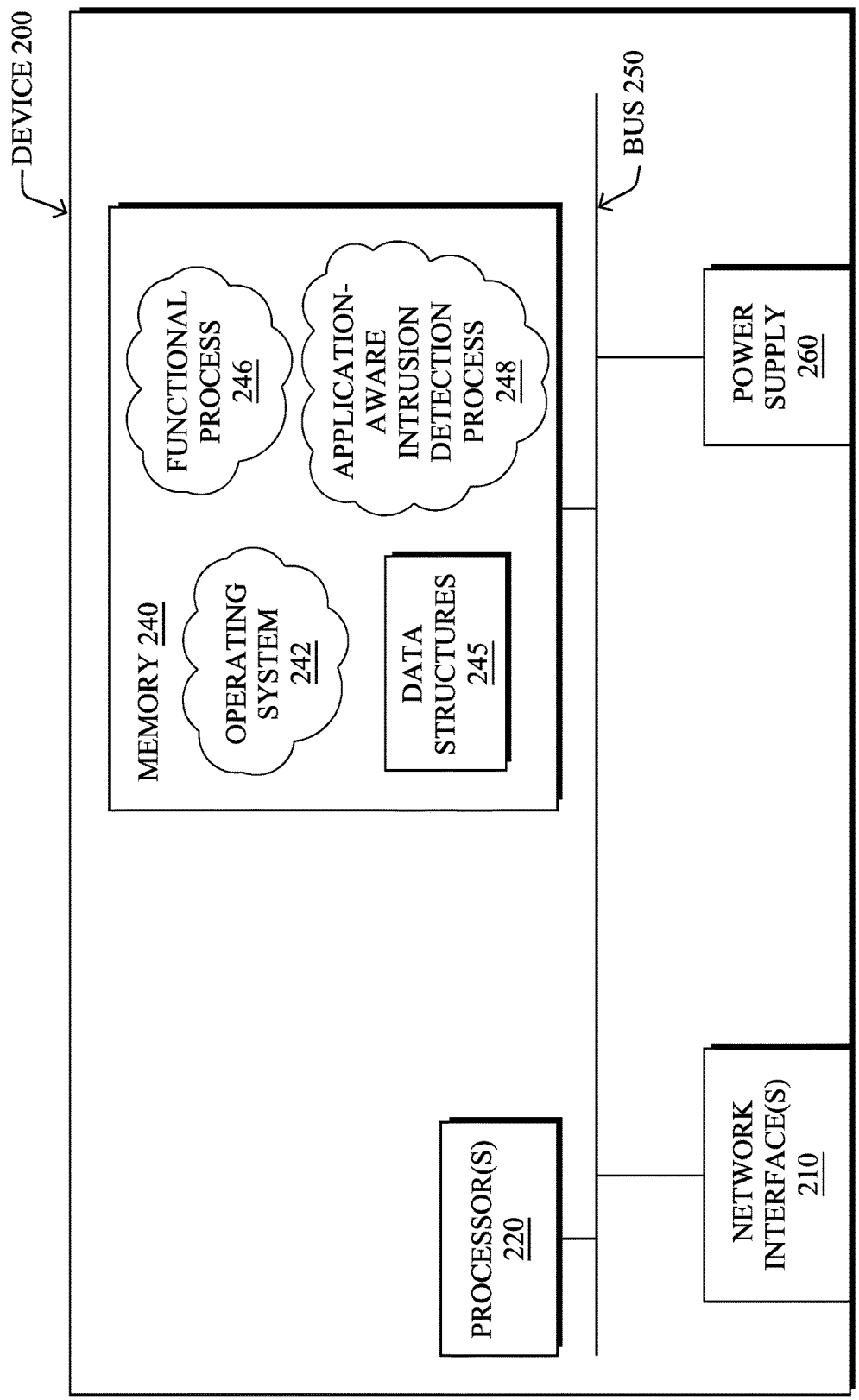
FIG. 2 illustrates an example computing device/node.

FIG. 2 is a schematic block diagram of an example computing device 200 that may be used with one or more embodiments described herein, e.g., as any of the devices shown in FIG. 1 above, and particularly as specific devices as described further below.

The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "application-aware intrusion detection" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Application Intelligence Platform

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
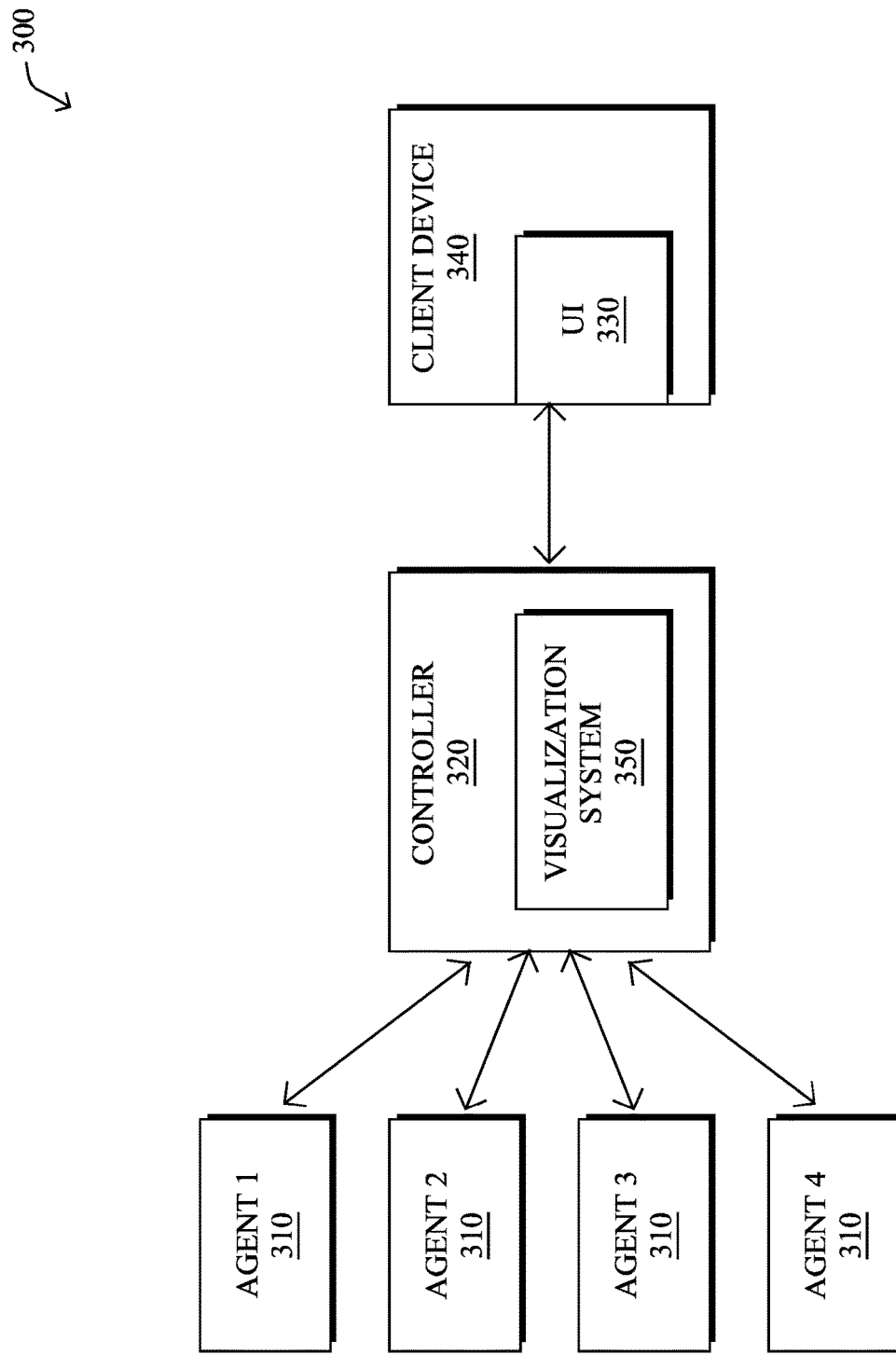
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
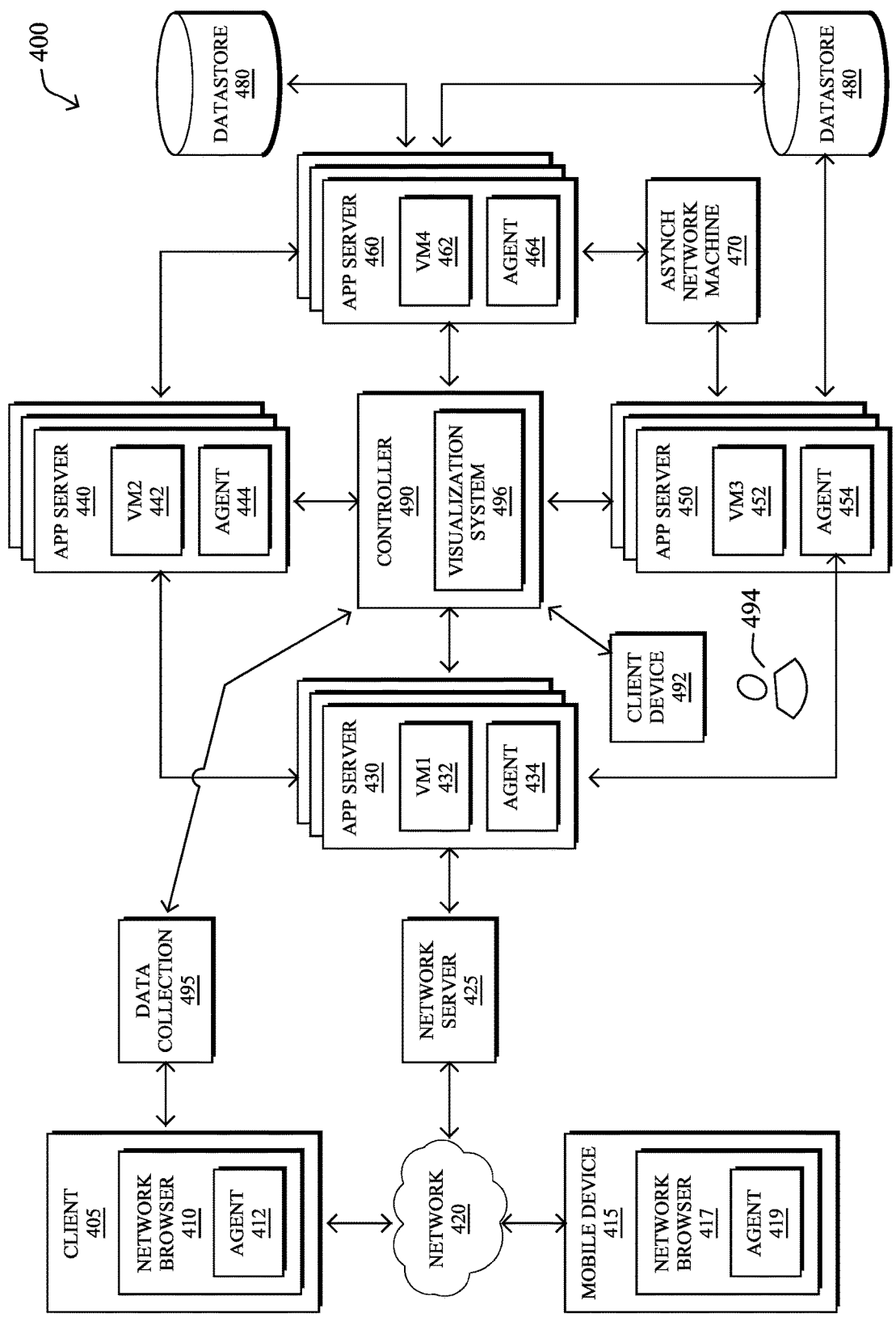
FIG. 4 illustrates an example system for an application-aware intrusion detection system.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may repot data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when a data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
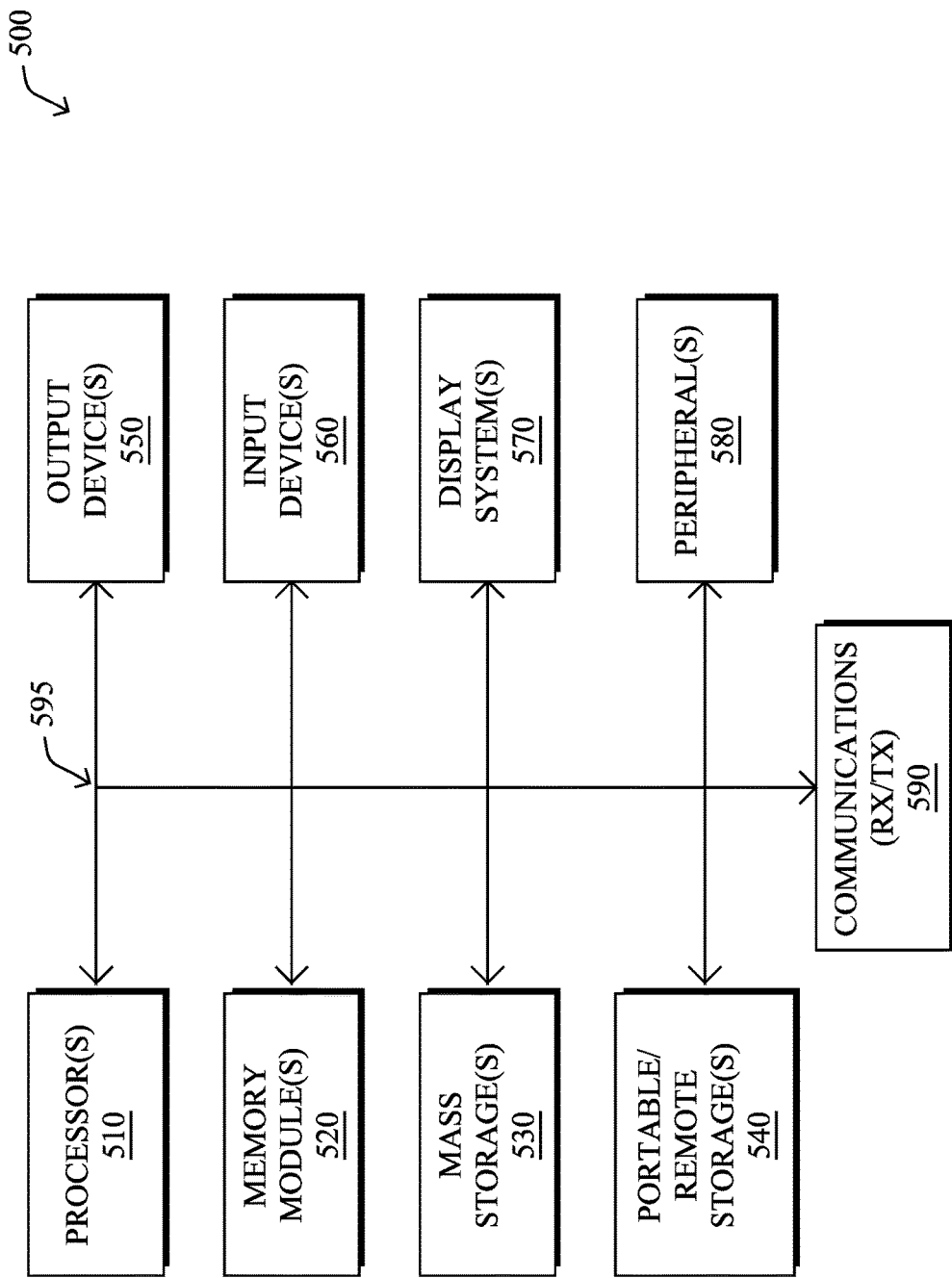
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG.

2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

Application-Aware Intrusion Detection System

As noted above, security is paramount for the integrity and performance of an application. For instance, cyberattacks have been known to cripple Internet sites, applications, and entire organizations. Many attacks, such as denial of service (DoS) or Distributed DoS (DDoS) attacks are simply meant to overrun servers with traffic (generally bogus) in order to prevent the servers from servicing legitimate requests. Other types of intrusions/attacks, such as spyware, malware, viruses, ransomware, bots, and so on, may also inflict some form of security threat (e.g., general interruptions, security breaches (e.g., accessing secure data, credit card information), etc.) to servers, client devices, or even specific applications executing on those servers/clients. Stopping attackers and malicious flows within a computer network is of critical importance to administrators, as is assessing the level of damage caused by such attacks.

The techniques herein, therefore, propose a mechanism for an application-aware intrusion detection system. In particular, the techniques herein provide network security for an application using an intrusion detection (or prevention) system. TCP flows that are flagged as malicious may also be identified against their application context (e.g., business transaction IDs). This tags the application call chains as susceptible to security threats, and the user can take corrective actions to fix the threat. Example corrective actions include fixing any security vulnerabilities in the application code or in some cases blocking specific attacker IPs from causing further harm to the application. The techniques herein also provide insight into the effects on a business transaction.

Specifically, according to one or more embodiments herein, activity of a plurality of applications in a computer network is monitored, and a plurality of individual business transactions occurring within the plurality of applications may be identified. Additionally network traffic details associated with each particular business transaction of the plurality of individual business transactions may be determined. In response to detecting a network-based threat on a particular network flow within the computer network, the techniques herein may correlate the particular network flow to a corresponding business transaction of the plurality of individual business transactions based on the associated network traffic details of the corresponding business transaction. Accordingly, threat mitigation may be initiated specific to the corresponding business transaction in response to the detected network-based threat being correlated to the corresponding business transaction.

Illustratively, the techniques described herein may be performed by hardware, software, and/or firmware, such as in accordance with the illustrative application-aware intrusion detection process 248, which may include computer executable instructions executed by the processor 220 to perform functions relating to the techniques described herein, e.g., in conjunction with corresponding processes of other devices in the computer network as described herein.

Operationally, the techniques herein apply a network-based intrusion detection system (NIDS) (or intrusion prevention system, IPS), that has the ability to perform real-time traffic analysis and packet logging on Internet Protocol (IP) networks. In particular, through the techniques herein, data from an IPS (external or internal) may be correlated with the application monitoring agents described above to monitor the impact of security vulnerabilities on business transactions. For instance, in one embodiment, the Application Intelligence Platform coordinates with or otherwise incorporates an external IPS (for example, the "Snort" application available from Cisco Systems, Inc.), which may detect network-based threat (e.g., an intrusion, attack, etc.), and alerts the network agent about malicious TCP flows. In another embodiment, the Application Intelligence Platform is configured with an internal IPS (e.g., on the network agents and/or controller 490), which also detects intrusions and determines the malicious flows, accordingly.

Figure 6:
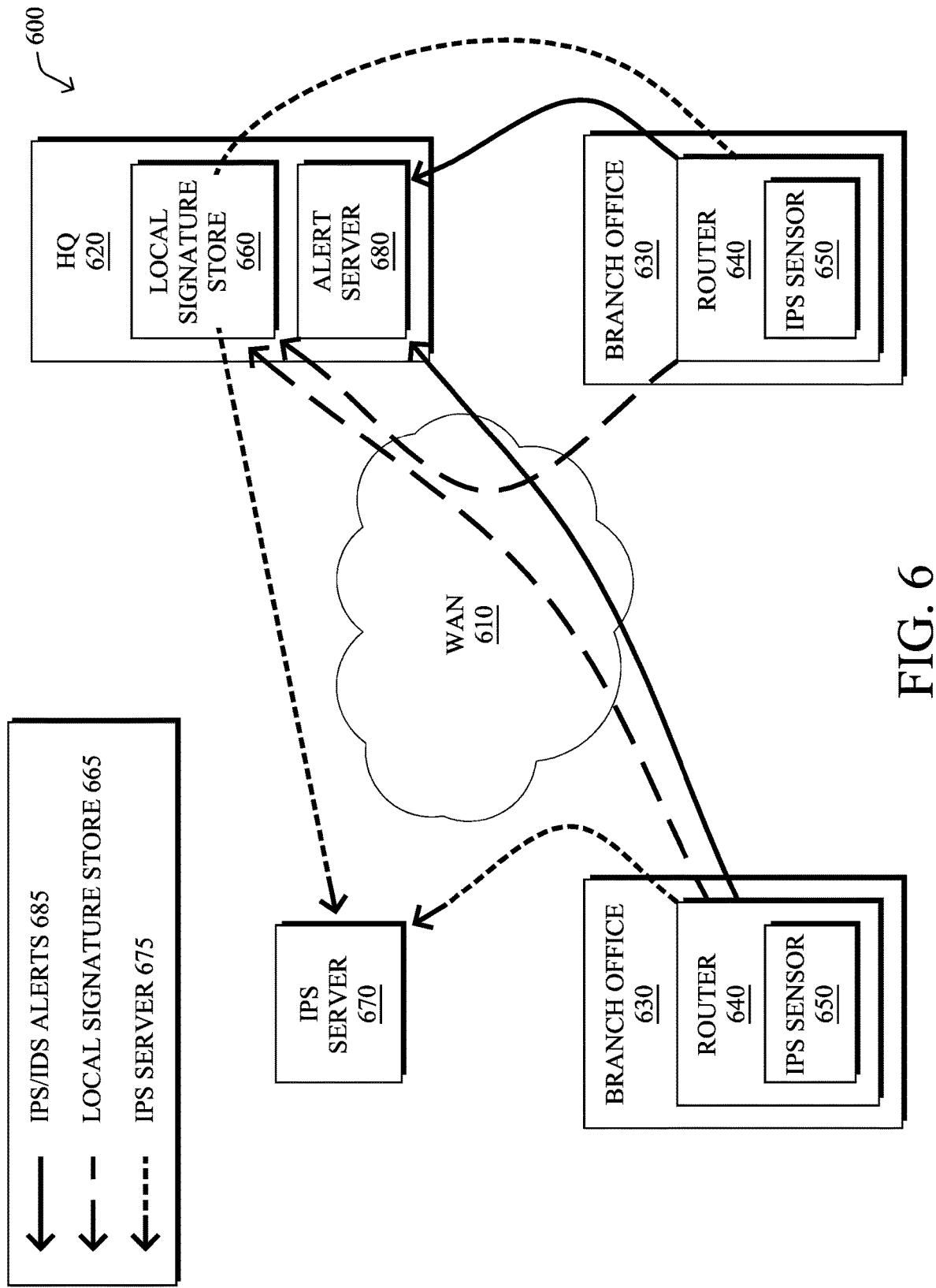
FIG. 6 illustrates an example intrusion detection/protection system.

An example IPS infrastructure 600 is shown in FIG. 6. In general, Intrusion Prevention System (IPS) or Intrusion Detection System (IDS) architectures are capable of real-time traffic analysis and packet logging on IP networks. They can perform protocol analysis, content searching/matching, and can be used to detect a variety of attacks and probes, such as buffer overflows, stealth port scans, common gateway interface (CGI) attacks, sever message block (SMB) probes, operating system (OS) fingerprinting attempts, and much more. An IPS can also be used as a packet sniffer like tcpdump, a packet logger (useful for network traffic debugging, etc.), network file logging device (capturing files in real-time from network traffic), and so on. In other words, an IPS monitors network traffic and analyzes against a defined rule set to perform attack classification, and may invoke actions against matched rules. In IDS mode, the system inspects the traffic and reports alerts, but does not take any action to prevent attacks. (That is, in IPS mode, in addition to intrusion detection, actions are taken to prevent attacks.) The terms IPS and IDS may be used interchangeably herein, and the techniques are not limited to only detection or only protection schemes.

The example infrastructure 600 comprises a network (e.g., WAN) 610 that interconnects a first local network (e.g., headquarters or "HQ") 620 to a plurality of branch offices 630 via routers 640. Notably, any connection across any network may be used, and the example of an enterprise network is not meant to limit the scope of the present disclosure. The specific IPS (or IDS) components of system 600 generally consist of the following entities, whether external to the application intelligence platform or as a standalone IPS system (such as shown in FIG. 6):

IPS (or IDS) sensors 650, which monitor the traffic to detect anomalies based on the configured security policies (that includes signatures, statistics, protocol analysis, and so on) and sends alert messages to the Alert/Reporting server. The sensor may be deployed as a virtual container service on the routers 640. (Said differently, the sensor may run as a service on routers, where service containers use virtualization technology to provide a hosting environment on network devices for applications.) Alternatively, IPS sensors 650 may operate separately from the routers (i.e., not inside the router), where in an "inline" mode the IPS sensors may be located at a point of the network after the router through which all traffic traverses, in order to monitor all traffic from the router.

Signature store 660, which hosts signature packages that are updated periodically. These signature packages are downloaded to sensors either periodically or on demand (messages 665). Validated Signature packages may be posted to a centralized server 670. Based on the configuration, signature packages can be downloaded from the centralized server (messages 675) or a local server.

Alert/Reporting server 680, which receives alert events from the sensors. Alert events 685 generated by the sensors can either be sent to the syslog or an external syslog server or to both internal and external syslogs. According to the techniques herein, the alert events may also (or alternatively) be sent to the Application Intelligence Platform (e.g., network agents).

Management (IPS) server 670 manages the IPS solution, and may be configured by an administrator.

Notably, IPS traffic inspection can be enabled either on a per interface basis or globally on all supported interfaces. The traffic to be inspected is diverted to the sensor and injected back. In Intrusion Detection System (IDS), identified threats are reported as log events and allowed. However, in Intrusion Prevention System (IPS), action is taken to prevent attacks along with log events.

Once a network-based threat on a flow is detected by a network agent (e.g., received from an external IPS, or detecting the threat itself), the network agent may then send these flows, or an indication of the flows, to a language agent to identify/associate these flows with a corresponding business transaction, to thus flag the corresponding node as under attack, as described herein. In particular, according to the techniques herein, the network agents know the details of TCP flows, the illustrative Java agent above maps the business transaction identifications, and the IPS highlights any threats/attacks.

Figure 7:
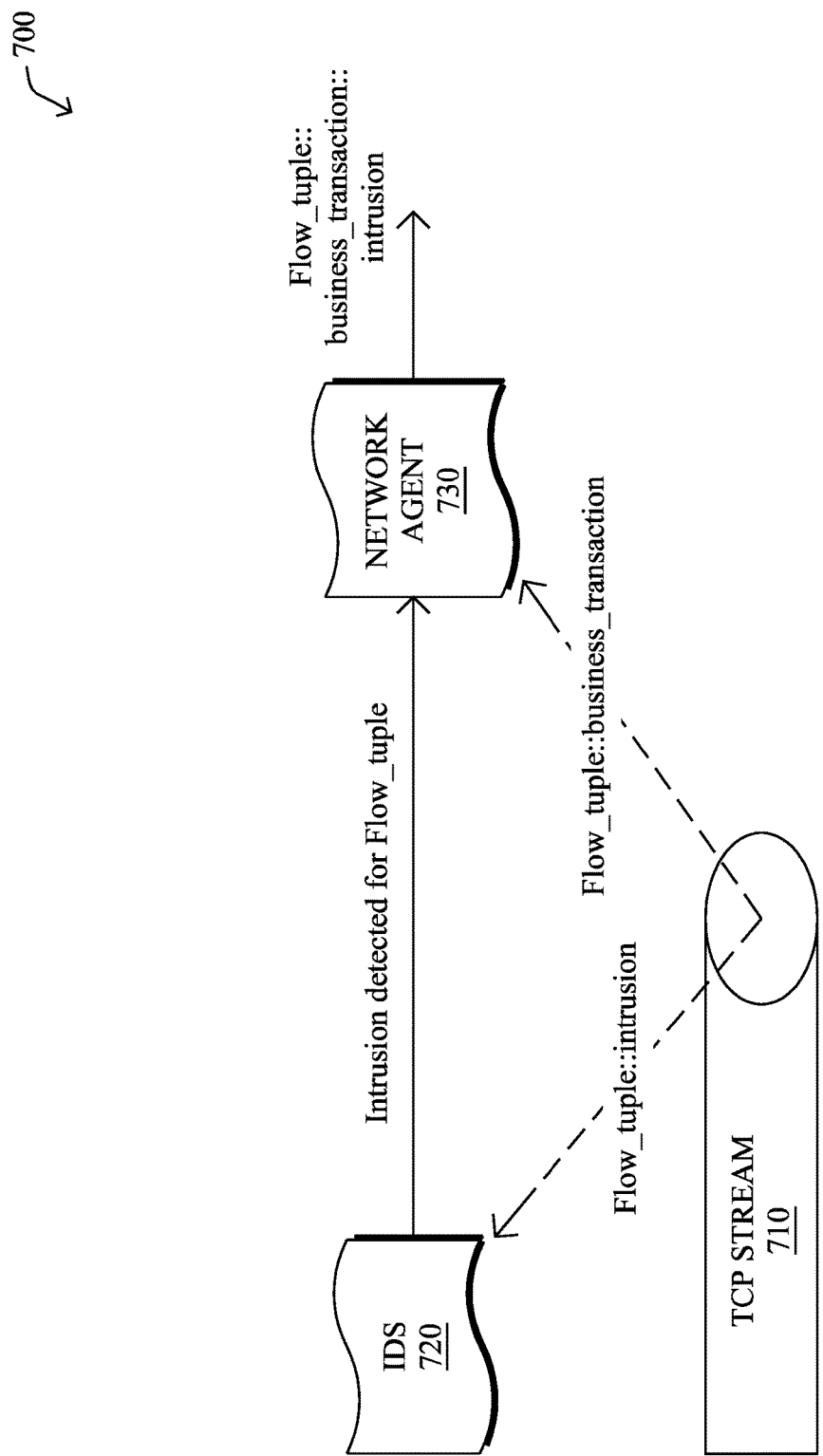
FIG. 7 illustrates an example threat detection flow.

In other words, according to one or more embodiments herein, and with reference to FIG. 7, a TCP stream (or other flow of data/packets) 710 may be monitored/examined for identification of a malicious thread from an intrusion detection/protection system (IDS/IPS) 720, which can be advantageously mapped by a network agent 730 to business transactions and/or nodes in the application monitoring platform network/application flow map. Threat detection is done via IPS technology (e.g., as described above), where detected threats are reported by the IPS technology through alerts. Note that to take actions on such alerts (e.g., an IPS solution rather than an IDS solution), a subscription model can be implemented and specific threats detected by an IPS solution can be turned into an actionable event.

The embodiments herein, specifically, perform threat-to-business-transaction mapping. A network visibility agent (network agent above) is configured to monitor all of the traffic (e.g., packets) that pass through the agent, i.e., that enter and leave a system where the network agent is installed. The network visibility agent is capable of reading all packets transferred inside and outside of a machine (e.g., obtaining statistics such as latency, loss, etc. in the process). Such packets can be examined by the network agent to identify the business transaction identifier (ID) (e.g., a Globally Unique Identifier (GUID) or Universally Unique Identifier (UUID)). Every packet that is seen may be assigned to a specific business transaction. By doing so, any flow (e.g., identified by a combination/tuple of source address, source port, destination address, destination port) can be mapped to a specific business transaction at a given time. Notably, one flow can have multiple business transactions associated with it.

IPS solutions are capable of alerting an identified threat including the source address, source port, destination address, and destination port (a flow tuple) of the connection on which a threat has been identified. But an IPS solution alone cannot identify which specific business transaction was targeted by the threat. Accordingly, the network visibility agent 730 working along with the alerts from IPS 710 can thereby map any alerted flow to a business transaction ID (e.g., GUID), provided that the threat happened on an identifiable business transaction. (An identifiable business transaction from a network visibility agent point of view will be one that has a valid GUID in the transaction.) After mapping a threat to a business transaction, the network visibility agent can pass the information to the controller for initiation of one or more mitigation actions (described below).

Said differently, a network agent associates the flow information with the business transaction identified by the GUID, and simultaneously reads any threat information sent from the Intrusion Detection System. The network agent makes a three-way association between the flow, the business transaction, and the threat with the flow tuple as the binding factor between data from the Intrusion Detection System and the network agent, as shown in FIG. 7.

Note that if a threat is identified on a packet without an associated business transaction (e.g., the business transaction ID/GUID), then this could indicated that there was not any specific business transaction that was being targeted or used in order to exploit possible vulnerabilities. Even in such cases, however, there would be a flow identified by the IPS solution where one of the nodes is present in the application intelligence system (e.g., a monitored network flow map). In such cases, even though a specific business transaction may not be identifiable, the techniques herein can still clearly identify and highlight a node that is under attack in the network flow map. This may be illustratively achieved by mapping the alert flow from the IPS solution to the network flow identified by the network visibility agent. Notably, the techniques herein not only allow for analysis of what business transaction is associated with a threat/attack, but can also identify a particular thread or node (on the flow level).

Figure 8:
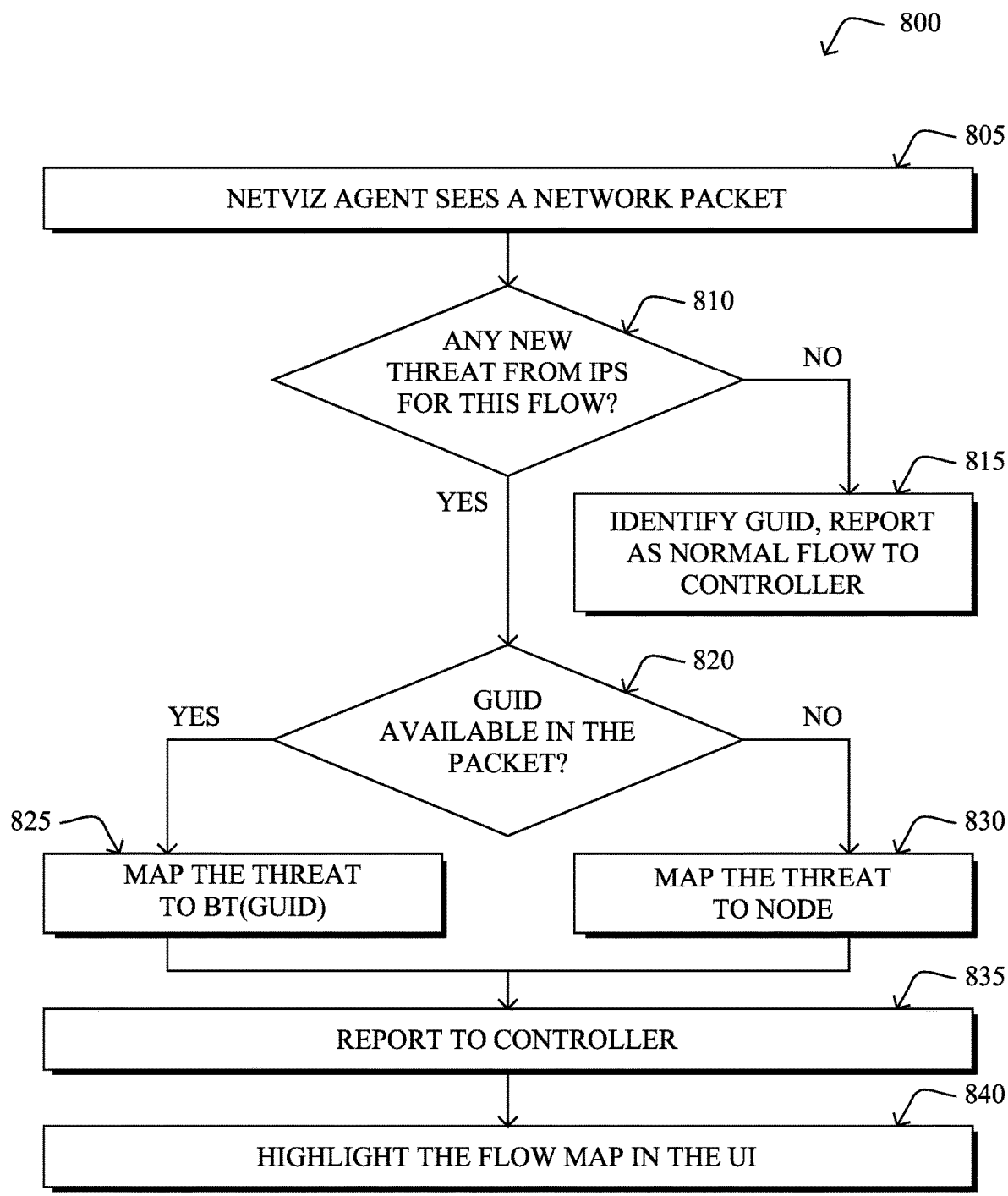
FIG. 8 illustrates an example simplified procedure for threat mapping.

FIG. 8 illustrates an example simplified procedure 800 for threat mapping in accordance with one or more embodiments described herein. For example, a non-generic, specifically configured device (e.g., device 200) may perform procedure 800 by executing stored instructions (e.g., process 248). Specifically, when, in step 805, a network visibility (NetViz) agent sees a packet, then the procedure continues to step 810 where the network agent determines whether there are any new threats associated with the corresponding flow. If not, then in step 815 the agent identifies the business transaction ID (e.g., GUID), and reports the flow as normal to the controller. If, however, there is a threat detected (e.g., by the network agent or by the external IDS/IPS), then if in step 820 a business transaction ID is available in the packet, the procedure continues to map the threat to the business transaction ID in step 825. Alternatively, where there is no business transaction ID in step 820, then in step 830 the threat is mapped to a node, as described above. Any associated report may then be generated for/by the controller in step 835, and the procedure may end after highlighting the threat (e.g., the flow map) in step 840.

Figure 9:
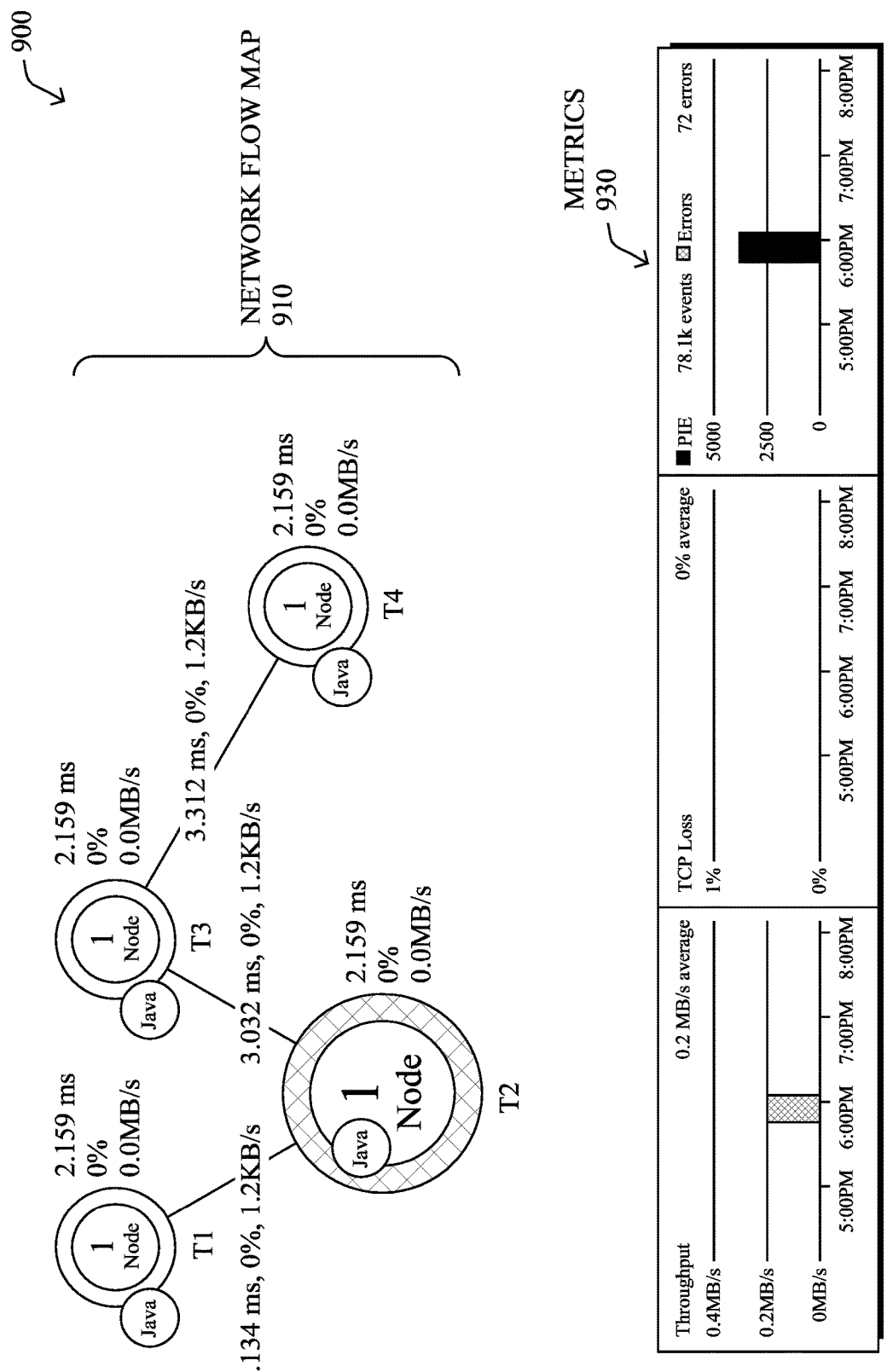
FIG. 9 illustrates an example of threat-to-node mapping.

FIG. 9 illustrates an example graphical user interface (GUI) 900 showing an example threat-to-node mapping. For instance, the UI can fetch the information and highlight the specific link or node for the business transaction as being under attack (e.g., red or x's as opposed to green or no x's), such that by viewing the network flow map 910, a user or administrator may be able to determine where the problem is. For instance, it can be seen in the example map 910 that node T2 is experiencing a threat condition. In certain embodiments, selecting the node T2 may open up further options/windows, such as remediation, data, and so on. Other metrics 930 may also be included within the GUI 900 to help visualize the effects of an attack (e.g., throughput, errors, etc.).

Figure 10:
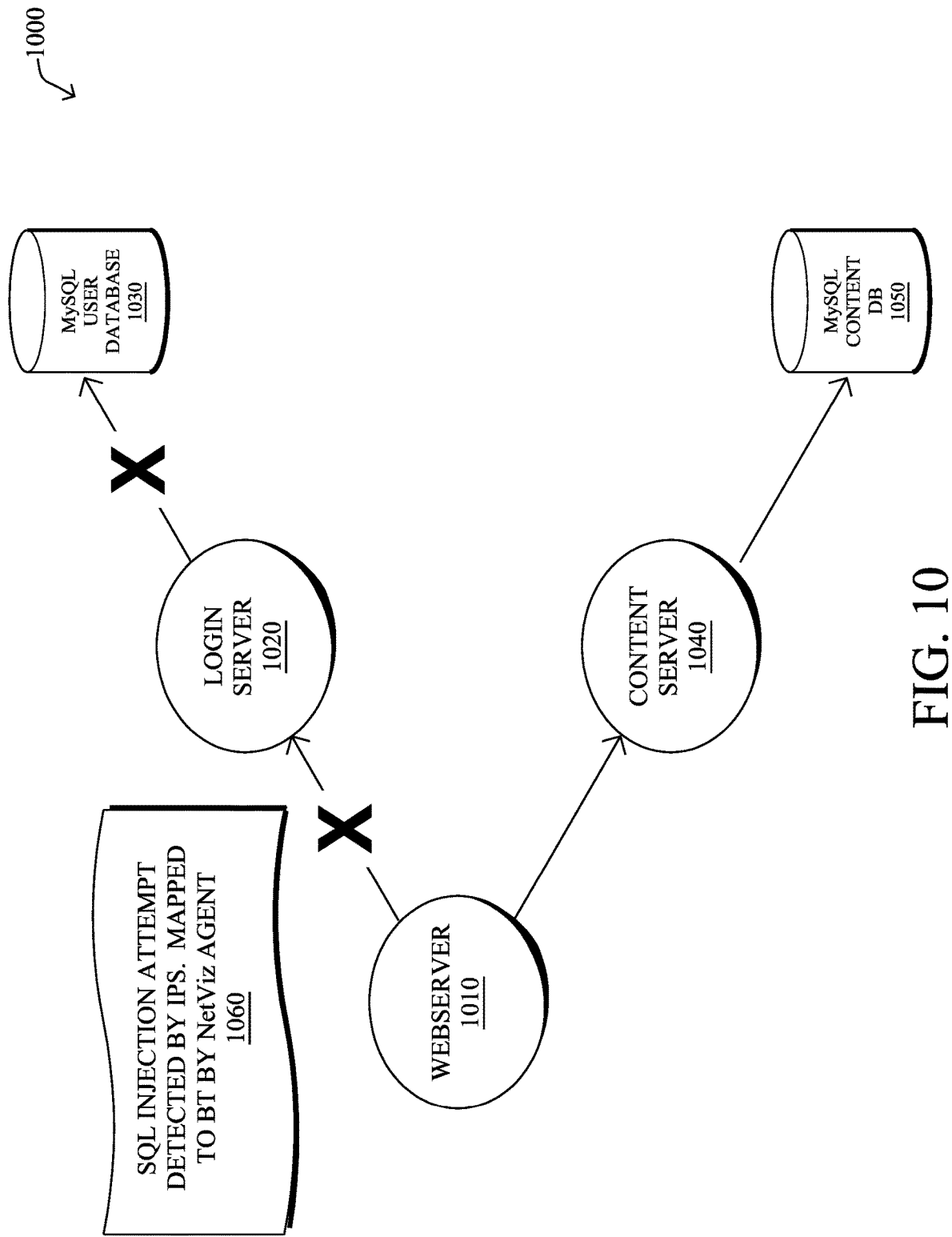
FIG. 10 illustrates an example business transaction ID threat identification.
Figure 11:
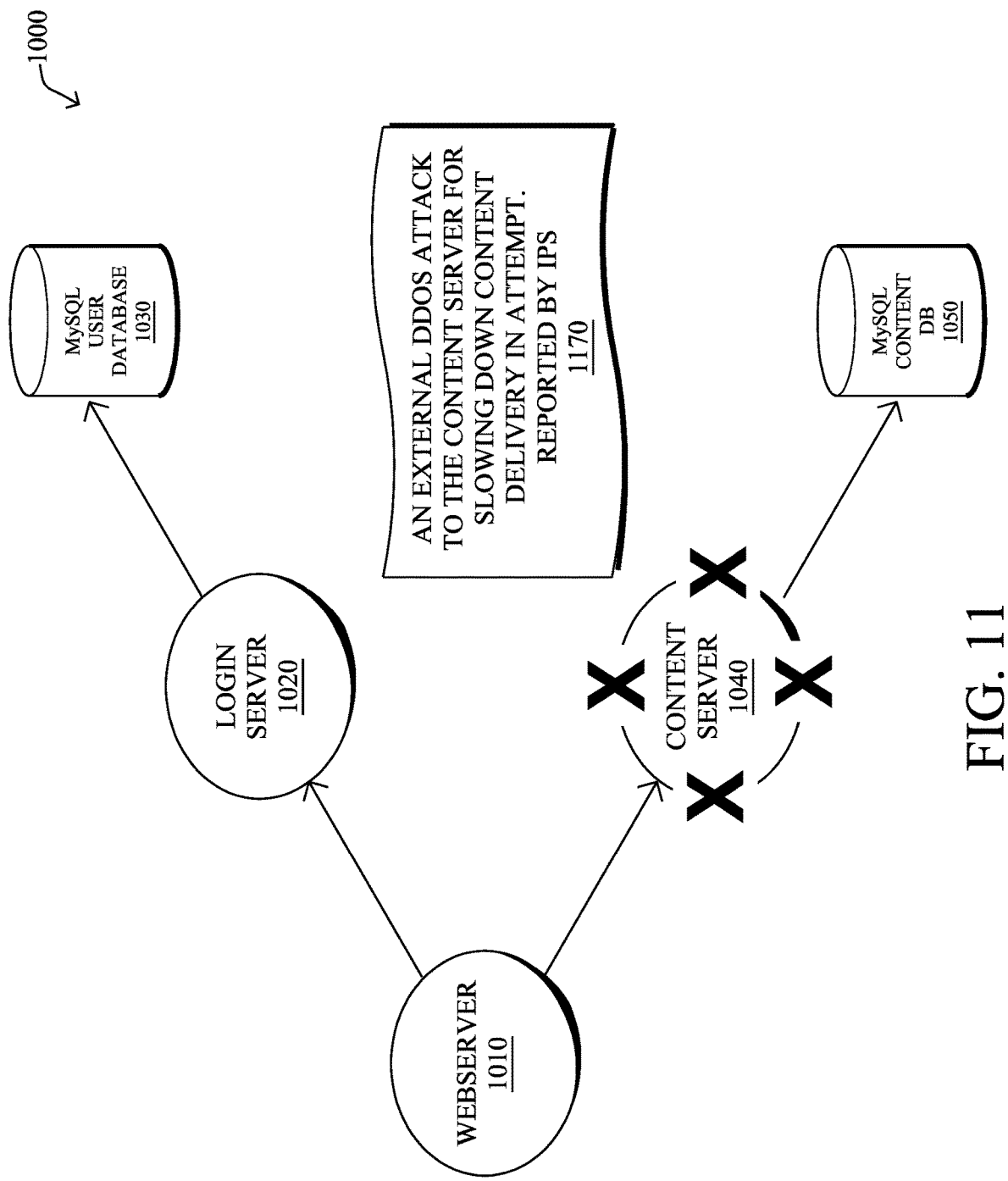
FIG. 11 illustrates an example node threat identification.

Note again that different threat correlations may be made herein (e.g., business transactions or nodes), and also different visualizations may be made. For instance, as shown in FIGS. 10-11, a network flow mapping 1000 may illustrate/comprise a web server 1010 that communicates via a login server 1020 to a MySQL user database 1030, and also via a content server 1040 to a MySQL content database 1050. FIG. 10, specifically, illustrates a business transaction threat identification example, where a SQL injection attempt 1060 is detected by IPS, and mapped to a particular business transaction (BT) by the network visualization (NetViz) agent (and shown by x's). Alternatively, FIG. 11 illustrates a node threat identification example, where an external DDoS attack 1170 to the content server for slowing down content delivery in the attempt is reported by IPS. Since this event may not be associated directly with a business transaction, the content server itself may be marked at threatened (e.g., as shown by x's).

Regarding threat mitigation/remediation, various forms of IDS/IPS action may be configured herein. For example, a highlighted threat on a flow map may come with user-initiated remediation suggestions (e.g., cease activity, shut down device, log off, etc.) or administrator-initiated remediation suggestions (e.g., block ports, shut down server, etc.). In case of threats mapped to business transactions, any further attempts on the same business transaction by the attacker can be blocked completely. Also, in the event of attacks similar to DDoS where there may not be a specific associated business transaction, the targeted nodes can be safeguarded by providing a remediation, such as by rate limiting the incoming traffic to those nodes from suspected attackers. As another example, one manner to mitigate attacks so other transactions/servers do not also suffer is to shut down ports/servers/etc. However, the techniques herein allow for calculated mitigation, where specific fixes to a determined root cause of the threat (e.g., blocking the source, blocking a particular IP, limiting traffic that is allowed, blacklisting IP addresses, applying other health rules, as mentioned above) may be based specifically on the mapped business transaction(s) (or node(s)), accordingly.

In still further embodiments of the techniques herein, a business impact of a threat/attack can also be quantified. That is, because of an attack, various business transactions may have been correspondingly affected (e.g., online purchases were halted or deleted, page visits were redirected to a malicious site, etc.). The techniques herein, therefore, may compare a given time period (e.g., the five minutes during or generally surrounding the attack) to the same or other comparable time period (e.g., the same five minutes from the day before), to show any affect (e.g., value lost, transactions lost, visits missed, revenue difference, etc.) due to the attack.

Figure 12:
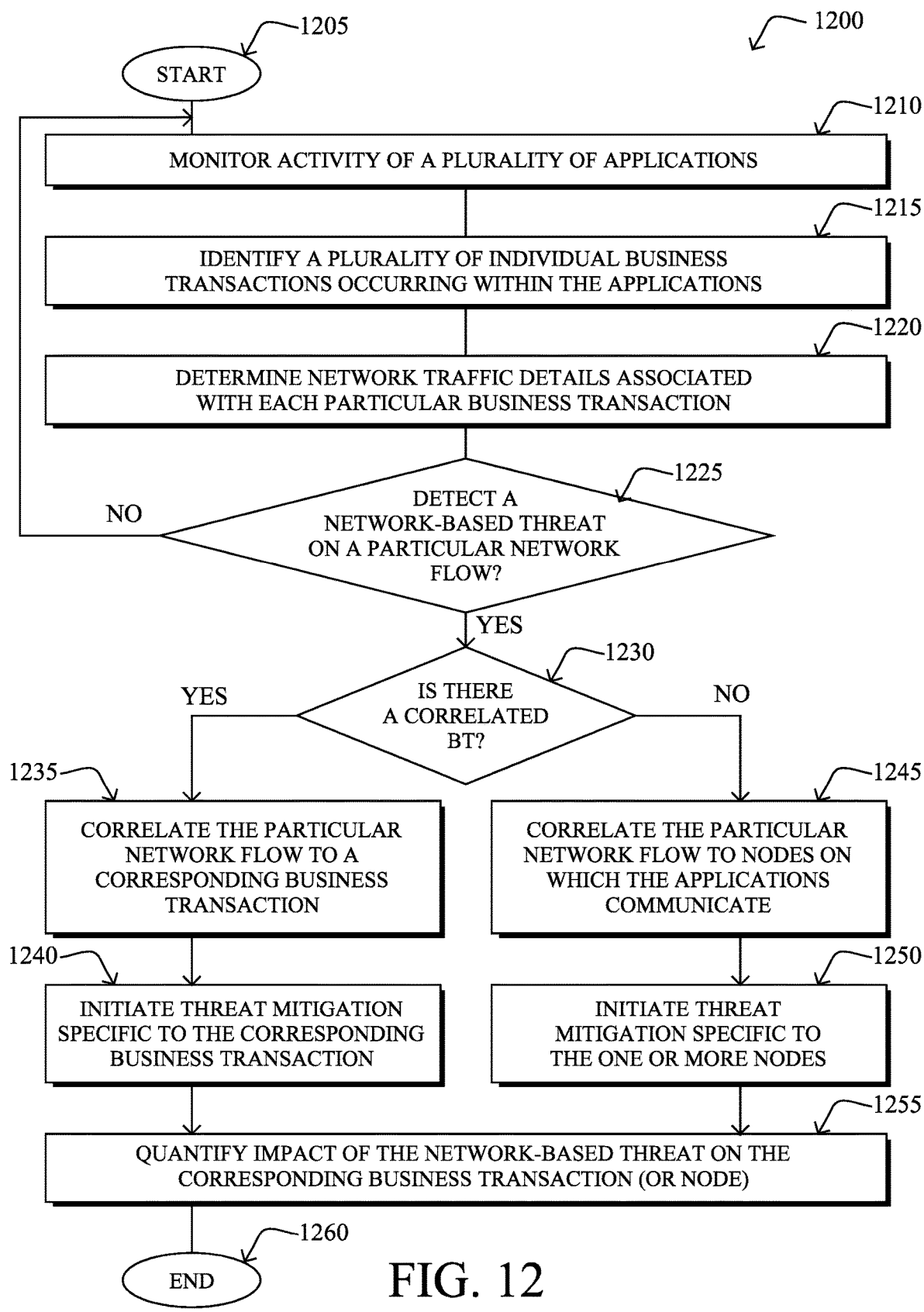
FIG. 12 illustrates an example simplified procedure for application-aware intrusion detection.

In closing, FIG. 12 illustrates an example procedure for providing an application-aware intrusion detection system in accordance with one or more embodiments described herein. For example, one or more non-generic, specifically configured devices (e.g., a controller, a network agent, server, etc.) may perform procedure 1200 by executing stored instructions. The procedure may start at step 1205, and continues to step 1210, where, as described in greater detail above, a "server" (e.g., the controller, a network agent, a combination thereof, etc.) monitors activity of a plurality of applications in a computer network, such as the controller specifically managing a plurality of application agents that add business transaction identifiers to application traffic in the computer network. In step 1215, the server may identify a plurality of individual business transactions occurring within the plurality of applications, as described above, while in step 1220, network traffic details (e.g., source/destination address/port tuples) associated with each particular business transaction of the plurality of individual business transactions may be determined. For instance, as described above, this may be illustratively accomplished by managing a plurality of network visibility agents that monitor traffic within computer network to locate the business transaction identifiers, and that determine network traffic details based on the monitored traffic with located business transaction identifiers.

This monitoring of the network and the operating applications continues until the illustrative server detects a network-based threat on a particular network flow within the computer network in step 1225. As detailed above, this step may involve receiving an indication of the network-based threat at the server from an external intrusion detection system, or else an intrusion detection system of the server may locally detect the network-based threat (e.g., based on some combination of rules-based detection, detected anomalies, trending behavior, access control lists (ACLs), blacklists, and so on).

Now, in step 1230, the illustrative server determines whether there is a business transaction correlated to the particular network flow (e.g., whether a corresponding business transaction can be mapped to the particular network flow of the threat based on a source address/port and destination address/port tuple of the corresponding business transaction matching that of the particular network flow). If so, then in step 1235 the particular network flow (threat) may be correlated to a corresponding business transaction (i.e., based on the associated network traffic details of the corresponding business transaction), and then in step 1240, in response to the detected network-based threat being correlated to the corresponding business transaction, some form of threat mitigation specific to the corresponding business transaction may be initiated. Alternatively, in response to there being no business transaction correlated to the particular network flow, then in step 1245 the particular network flow (threat) may be correlated to one or more nodes (on which the plurality of applications communicate, i.e., within the application intelligence architecture network) based on the monitored activity of the plurality of applications, as described above (e.g., which nodes are used by the applications, regardless of identified business transactions in the threat's flow). Accordingly, in step 1250, threat mitigation may also be initiated specific to the one or more nodes (in response to the detected network-based threat being correlated to the one or more nodes).

Notably, as mentioned above, threat mitigation may be based on detection and reporting, such as, e.g., notifying an application user, notifying an application administrator, notifying an administrator of the server, highlighting the network-based threat in a graphical user interface, and so on. Alternatively or in addition, threat mitigation may be more proactively protective, such as, e.g., blocking the network-based threat, rate limiting network traffic, closing specific ports, shutting down specific servers, adding source addresses to a blacklist, initiating one or more health rules, changing one or more health rules, and so on. Note further that threat mitigation specific to the corresponding business transaction may affect only the particular business transaction, or else may more broadly affect more business transactions than just the corresponding business transaction (correlated to the threat itself). For example, shutting down a particular port will affect any transactions using that port, while cancelling the current business transaction only affects that one transaction.

Optionally, in step 1255, the techniques herein may quantify an impact of the network-based threat on the corresponding business transaction. For example, this may be achieved by comparing first metrics from a first plurality of business transactions occurring within a first time period corresponding to the network-based threat to second metrics from a second plurality of business transactions occurring within a second time period not corresponding to the network-based threat, as mentioned above. Accordingly, differences between the first metrics and the second metrics may be highlighted (e.g., reported, illustrated on a GUI, etc.).

The simplified example procedure 1200 may then end in step 1260, notably with the option to continue monitoring the network for further business transactions and further network-based threats. It should be noted, as well, that correlating a particular network flow to a corresponding business transaction may more specifically comprise correlating the particular network flow to a plurality of corresponding business transactions (i.e., based on the associated network traffic details of the plurality corresponding business transactions each being associated with the same particular network flow). That is, a single flow may be associated with multiple business transactions, and as such, the correlation includes all matching business transactions, and initiating threat mitigation comprises initiating threat mitigation specific to the plurality of corresponding business transactions, accordingly.

It should be noted that certain steps within procedures 800 and 1200 may be optional as described above, and the steps shown in FIGS. 8 and 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800 and 1200 are described separately, certain steps from each procedure may be incorporated into each other procedure, and the procedures are not meant to be mutually exclusive.

The techniques described herein, therefore, provide for an application-aware intrusion detection system. In particular, the techniques herein monitor security as part of infrastructure monitoring, allowing threats to be correlated with an application context (e.g., transaction ID). Being able to detect and show vulnerable or targeted business transactions and nodes allows for easily alerting the user on possible impacts of an ongoing attack attempt in near real-time fashion. Further it is also possible to identify the BTs that are affected due to a specific attack that was done on the network. That is, while current products use and/or provide network intrusion detection, the techniques herein leverage intrusion detection data, correlated with the application context, and measure and show the business impact of network security threats on an application (e.g., application transactions). Integrating intrusion detection and application monitoring allows for many other new possibilities, such as, e.g., creating automated remediation scripts that execute to notify/alert concerned personnel and may implement appropriate health rules to mitigate the threat, and unlike historically blunt-forced remediation (shutting down servers, closing ports, unplugging servers, etc.), the techniques herein provide for a much more surgical precision for analysis and mediation.

While there have been shown and described illustrative embodiments that provide for an application-aware intrusion detection system, it is to be understood that various other adaptations and modifications may be made within the spirit and scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any invention or of what may be claimed, but rather as descriptions of features that may be specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be escribed above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a server, monitored activity of a plurality of applications in a computer network;
    identifying, by the server, a plurality of individual business transactions occurring within the plurality of applications;
    managing, by the server, a plurality of application agents that add business transaction identifiers to application traffic in the computer network;
    determining, by the server, network traffic details associated with each particular business transaction of the plurality of individual business transactions;
    detecting, by the server, a network-based threat on a particular network flow within the computer network;
    upon detecting a network-based threat, examining, by the server, the particular network flow to determine a presence of a particular business transaction identifier of the added business transaction identifiers in the particular network flow;
    when the particular network flow includes the particular business transaction identifier:
        correlating, by the server, the particular network flow to a corresponding business transaction of the plurality of individual business transactions based on the business transaction identifier,
        tagging, by the server, an application call chain associated with the corresponding business transaction, and
        initiating, by the server, threat mitigation specific to the corresponding business transaction based on the tagging; and
    when the particular network flow does not include the particular business transaction identifier:
        correlating, by the server, the particular network flow to one or more nodes on which the plurality of applications communicate based on the monitored activity of the plurality of applications, and
        initiating, by the server, threat mitigation specific to the one or more nodes.

2. The method as in claim 1, wherein threat mitigation is selected from a group consisting of: notifying an application user; notifying an application administrator; notifying an administrator of the server; and highlighting the network-based threat in a graphical user interface.

3. The method as in claim 1, wherein threat mitigation is selected from a group consisting of: blocking the network-based threat; rate limiting network traffic; closing specific ports; shutting down specific servers; adding source addresses to a blacklist; initiating one or more health rules; and changing one or more health rules.

4. The method as in claim 1, wherein threat mitigation specific to the corresponding business transaction affects more of the plurality of individual business transactions than just the corresponding business transaction.

5. The method as in claim 1, wherein detecting the network-based threat comprises:
    receiving an indication of the network-based threat at the server from an external intrusion detection system.

6. The method as in claim 1, wherein detecting the network-based threat comprises:
    locally detecting the network-based threat at an intrusion detection system of the server.

7. The method as in claim 6, wherein locally detecting the network-based threat is based on one or more of: rules-based detection, detected anomalies, trending behavior, access control lists (ACLs), and blacklists.

8. The method as in claim 1, wherein:
determining network traffic details comprises managing a plurality of network visibility agents that monitor traffic within computer network to locate the business transaction identifiers and that determine network traffic details based on the monitored traffic with located business transaction identifiers.

9. The method as in claim 1, wherein correlating the particular network flow to the corresponding business transaction comprises:
mapping the corresponding business transaction to the particular network flow based on a source address/port and destination address/port tuple of the corresponding business transaction matching a source address/port and destination address/port tuple of the particular network flow.

10. The method as in claim 1, wherein:
correlating the particular network flow to the corresponding business transaction comprises correlating the particular network flow to a plurality of corresponding business transactions of the plurality of individual business transactions based on the associated network traffic details of the plurality of corresponding business transactions each being associated with the same particular network flow; and
initiating threat mitigation comprises initiating threat mitigation specific to the plurality of corresponding business transactions.

11. The method as in claim 1, further comprising:
quantifying an impact of the network-based threat on the corresponding business transaction.

12. The method as in claim 11, wherein quantifying the impact comprises:
comparing first metrics from a first plurality of business transactions occurring within a first time period corresponding to the network-based threat to second metrics from a second plurality of business transactions occurring within a second time period not corresponding to the network-based threat; and
highlighting differences between the first metrics and the second metrics.

13. An apparatus, comprising:
one or more network interfaces configured to communicate in a computer network;
a processor coupled to the network interfaces and adapted to execute one or more processes; and
a memory configured to store a process executable by the processor, the process when executed operable to:
determine monitored activity of a plurality of applications in a computer network;
identify a plurality of individual business transactions occurring within the plurality of applications;
manage a plurality of application agents that add business transaction identifiers to application traffic in the computer network;
determine network traffic details associated with each particular business transaction of the plurality of individual business transactions;
detect a network-based threat on a particular network flow within the computer network;
upon detecting the network-based threat, examine the particular network flow to determine a presence of a particular business transaction identifier of the added business transaction identifiers in the particular network flow;
when the particular network flow includes the particular business transaction identifier:
correlate the particular network flow to a corresponding business transaction of the plurality of individual business transactions based on the business transaction identifier,
tag an application call chain associated with the corresponding business transaction, and
initiate threat mitigation specific to the corresponding business transaction based on the tagging; and
when the particular network flow does not include the particular business transaction identifier:
correlate the particular network flow to one or more nodes on which the plurality of applications communicate based on the monitored activity of the plurality of applications, and
initiate threat mitigation specific to the one or more nodes.

14. The apparatus as in claim 13, wherein threat mitigation is selected from a group consisting of: notifying an application user; notifying an application administrator; notifying an administrator of the apparatus; highlighting the network-based threat in a graphical user interface; blocking the network-based threat; rate limiting network traffic; closing specific ports; shutting down specific servers; adding source addresses to a blacklist; initiating one or more health rules; and changing one or more health rules.

15. The apparatus as in claim 13, wherein the process when executed to detect the network-based threat is further operable to:
receive an indication of the network-based threat from an external intrusion detection system.

16. The apparatus as in claim 13, wherein the process when executed to correlate the particular network flow to the corresponding business transaction is further operable to:
map the corresponding business transaction to the particular network flow based on a source address/port and destination address/port tuple of the corresponding business transaction matching a source address/port and destination address/port tuple of the particular network flow.

17. The apparatus as in claim 13, wherein the process when executed is further operable to:
quantify an impact of the network-based threat on the corresponding business transaction.

18. A tangible, non-transitory, computer-readable medium storing program instructions that cause a computer to execute a process comprising:
determining monitored activity of a plurality of applications in a computer network;
identifying a plurality of individual business transactions occurring within the plurality of applications;
managing a plurality of application agents that add business transaction identifiers to application traffic in the computer network;
determining network traffic details associated with each particular business transaction of the plurality of individual business transactions;
detecting a network-based threat on a particular network flow within the computer network;
upon detected the network based-threat, examining the particular network flow to determine a presence of a particular business transaction identifier of the added business transaction identifiers in the particular network flow;

when the particular network flow includes the particular business transaction identifier:
- correlating the particular network flow to a corresponding business transaction of the plurality of individual business transactions based on the business transaction identifier,
- tagging, by the server, an application call chain associated with the corresponding business transaction, and
- initiating threat mitigation specific to the corresponding business transaction based on the tagging; and when the particular network flow does not include the particular business transaction identifier:
- correlating the particular network flow to one or more nodes on which the plurality of applications communicate based on the monitored activity of the plurality of applications, and
- initiating threat mitigation specific to the one or more nodes.

* * * * *

UNITED STATES PATENT AND TRADEMARK OFFICE
CERTIFICATE OF CORRECTION

PATENT NO. : 10,862,921 B2
APPLICATION NO. : 15/664224
DATED : December 8, 2020
INVENTOR(S) : Syed Abdul Ahad Page 1 of 1

It is certified that error appears in the above-identified patent and that said Letters Patent is hereby corrected as shown below:

In the Specification

Column 23, Line 28, please amend as shown:
may be described above as acting in certain combinations and Signed and Sealed this
Second Day of March, 2021

Drew Hirshfeld
*Performing the Functions and Duties of the*
*Under Secretary of Commerce for Intellectual Property and*
*Director of the United States Patent and Trademark Office*